(12) United States Patent
Sosa et al.

(10) Patent No.: US 8,560,873 B1
(45) Date of Patent: Oct. 15, 2013

(54) DETERMINATION OF TRANSITIONAL CHARACTERISTIC ATTRIBUTES OF COMPONENTS DURING SCHEDULED WAKE-UP POWER TRANSITION OF COMPUTING DEVICE

(75) Inventors: Chris Sosa, Sunnyvale, CA (US); Darin Petkov, Sunnyvale, CA (US); Sameer Nanda, San Jose, CA (US)

(73) Assignee: Google Inc., Mountain View, CA (US)

( * ) Notice: Subject to any disclaimer, the term of this patent is extended or adjusted under 35 U.S.C. 154(b) by 333 days.

(21) Appl. No.: 13/006,070

(22) Filed: Jan. 13, 2011

(51) Int. Cl.
*G06F 1/32* (2006.01)
(52) U.S. Cl.
USPC .......................................... 713/323; 712/502
(58) Field of Classification Search
None
See application file for complete search history.

(56) References Cited

U.S. PATENT DOCUMENTS

| | | | |
|---|---|---|---|
| 5,625,882 A * | 4/1997 | Vook et al. | 340/7.34 |
| 6,473,607 B1 * | 10/2002 | Shohara et al. | 455/343.1 |
| 2006/0270382 A1 * | 11/2006 | Lappetelainen et al. | 455/343.2 |

OTHER PUBLICATIONS

"Hibernation (computing)", Wikipedia, the free encyclopedia, Feb. 26, 2011, 4 pages.
"Sleep Mode", Wikipedia, the free encyclopedia, Feb. 22, 2011, 2 pages.

\* cited by examiner

*Primary Examiner* — Kenneth Kim
(74) *Attorney, Agent, or Firm* — Brake Hughes Bellermann LLP

(57) ABSTRACT

Apparatus and methods for gathering and analyzing operating statistics are disclosed. An example method includes automatically scheduling a wake-up event, where occurrence of the wake-up event, initiating, after scheduling the wake-up event, a transition of the computing device from an active power state to a low power state, initiating a transition of the computing device from the low power state to the active power state in response to occurrence of the scheduled wake-up event, gathering a first set of one or more operating statistics in response to the transition from the low power state to the active power state in response to occurrence of the wake-up event and analyzing the first set of one more operating statistics to determine one or more performance attributes of the computing device associated with the transitions between the low power state and the active power state.

29 Claims, 9 Drawing Sheets

DETERMINATION OF TRANSITIONAL CHARACTERISTIC ATTRIBUTES OF COMPONENTS DURING SCHEDULED WAKE-UP POWER TRANSITION OF COMPUTING DEVICE

TECHNICAL FIELD

This document relates, generally, to measurement and use of operating statistics for a computing device.

BACKGROUND

With the continued advancement of computing technology, the demand for computing technology manufacturers to develop new computing devices continues to increase. One aspect of development of such devices is the gathering of data (operating statistics) associated with operation of a computing device being developed, analyzing that data, and making changes to improve performance based on the data. For computing devices that are able to operate in different power states, a manufacturer may gather data (operating statistics) related to operation of the computing device before, during, and after transitions between different power states. Gathering of such operating statistics may be labor intensive and time consuming due to, at least, a need for user (human) intervention in gathering such operating statistics.

SUMMARY

In one general aspect, a computer-implemented method includes automatically scheduling a wake-up event, where occurrence of the wake-up event causes a computing device to transition from a low power state to an active power state; initiating, after scheduling the wake-up event, a transition of the computing device from the active power state to the low power state; initiating the transition of the computing device from the low power state to the active power state in response to occurrence of the scheduled wake-up event; gathering a first set of one or more operating statistics of the computing device in response to the transition of the computing device from the low power state to the active power state in response to occurrence of the wake-up event; and analyzing the first set of one more operating statistics to determine one or more performance attributes of the computing device associated with the transitions between the low power state and the active power state.

Implementations may include one or more of the following features. For example, scheduling the wake-up event may include scheduling a real-time-clock alarm. The low power state may be a suspend-to-RAM power state, a suspend-to-disk power state or a powered-off power state. The active power state may be a low-power active power state or a full-power active power state.

The one or more performance attributes may include a time period measurement corresponding with a time period for the transition from the low power state to the active power state.

The one or more performance attributes of the computing device may include at least one of a first time period measurement corresponding with a time period from the wake-up event until an embedded controller of the computing device becomes operational; a second time period measurement corresponding with a time period from the embedded controller of the computing device becoming operational until firmware of the computing device becomes operational; a third time period measurement corresponding with a time period from the firmware becoming operational until an operating system kernel of the computing device becomes operational; and a fourth time period measurement corresponding with a time period from the operating system kernel becoming operational until an operating system of the computing device becomes operational.

The one or more performance attributes may include respective operational statuses of one or more hardware components of the computing device. The one or more performance attributes may include respective operational statuses of one or more software components of the computing device. The one or more performance attributes may include respective time period measurements corresponding with respective time periods for one or more hardware components of the computing device to become functional after occurrence of the wake-up event. The one or more performance attributes may include respective time period measurements corresponding with respective time periods for one or more software components of the computing device to become functional after occurrence of the wake-up event.

The computer-implemented method may include gathering a second set of one or more operating statistics of the computing device after scheduling the wake-up event and prior to occurrence of the wake-up event; and generating a set of one or more comparison statistics based on the first set of operating statistics and the second set of operating statistics. The one or more comparison statistics may include an energy consumption measurement.

The computer-implemented method may include, based on the comparison statistics, determining whether to automatically schedule a second wake-up event; gather a third set of one or more operating statistics of the computing device; initiate another transition from the active power state to the low power state; initiate another transition of the computing device from the low power state to the active power state in response to occurrence of the second wake-up event; and gather a fourth set of one or more operating statistics of the computing device in response to the second transition of the computing device from the low power state to the active power state.

The computer-implemented method may include comparing the first set of operating statistics of the computing device with a second set of operating statistics gathered from a previous version of the computing device; determining, based on the comparison, whether any of the first set of operating statistics has, respectively, a statistically significant variation from the second set of operating statistics; and, in the event a statistically significant variation is determined, identifying one or more aspects of a development process causing the statistically significant difference based on the first and second set of operating statistics.

In another general aspect, a computer-implemented method includes establishing a number of loop iterations to be performed by a computing device, and, for each loop iteration automatically scheduling a wake-up event, where occurrence of the wake-up event causes the computing device to transition from a low power state to an active power state; initiating a transition of the computing device from the active power state to the low power state; initiating the transition of the computing device from the low power state to the active power state in response to occurrence of the wake-up event; gathering a set of one or more operating statistics of the computing device in response to the transition of the computing device from the low power state to the active power state; modifying a loop iteration counter to indicate completion of a loop iteration; and determining, based on the loop iteration counter and the number of loop iterations to be performed, if execution of the loop is complete; and, after completion of the loop, performing regression analysis on the operating statistics gathered during execution of the loop.

Implementations may include one or more of the following features. For example, the first set of one or more operating statistics of the computing device, for each loop iteration, may include time measurements corresponding with a time period for the transition from the low power state to the active power state. The first set of one or more operating statistics of the computing device, for each loop iteration, may include respective operational statuses of one or more hardware components of the computing device. The first set of one or more operating statistics of the computing device, for each loop iteration, may include respective operational statuses of one or more software components of the computing device.

The computer-implemented method may include, for each loop iteration, gathering a second set of one or more operating statistics of the computing device after scheduling the wake-up event and prior to occurrence of the wake-up event. The second set of one or more operating statistics of the computing device, for each loop iteration, may include time measurements corresponding with a time period for the transition from the active power state to the low power state. The second set of one or more operating statistics of the computing device, for each loop iteration, may include respective operational statuses of one or more hardware components of the computing device. The second set of one or more operating statistics of the computing device, for each loop iteration, may include respective operational statuses of one or more software components of the computing device.

In another general aspect, a recordable storage medium has recorded and stored thereon instructions that, when executed, cause a computing device to automatically schedule a wake-up event, wherein occurrence of the wake-up event causes a computing device to transition from a low power state to an active power state; initiate, after scheduling the wake-up event, a transition of the computing device from the active power state to the low power state; initiate the transition of the computing device from the low power state to the active power state in response to occurrence of the wake-up event; gather a first set of one or more operating statistics of the computing device in response to the transition of the computing device from the low power state to the active power state in response to occurrence of the wake-up event; and perform an analysis of the first set of one more operating statistics to determine one or more performance attributes of the computing device associated with the transitions between the low power state and the active power state.

Implementations may include one or more of the following features. For example, the instructions, when executed, may cause the computing device to gather a second set of one or more operating statistics of the computing device after scheduling the wake-up event and prior to occurrence of the wake-up event; and generate a set of one or more comparison statistics based on the first set of operating statistics and the second set of operating statistics. The instructions, when executed, may cause the computing device to compare the first set of operating statistics of the computing device with a second set of operating statistics gathered from a previous version of the computing device, determine, based on the comparison, whether any of the first set of operating statistics has, respectively, a statistically significant variation from the second set of operating statistics, and, in the event a statistically significant variation is determined, identify one or more aspects of a development process causing the statistically significant difference based on the first and second set of operating statistics.

In another general aspect, a recordable storage medium has recorded and stored thereon instructions that, when executed, cause a computing device to establish a number of loop iterations to be performed by the computing device, and, for each loop iteration: automatically schedule a wake-up event, wherein occurrence of the wake-up event causes the computing device to transition from a first power state to a second power state; initiate a transition of the computing device from the second power state to the first power state; initiate the transition of the computing device from the first power state to the second power state in response to occurrence of the wake-up event; gather a set of one or more operating statistics of the computing device in response to the transition of the computing device from the first power state to the second power state; modify a loop iteration counter to indicate completion of a loop iteration; and determine, based on the loop iteration counter and the number of loop iterations to be performed, if execution of the loop is complete, and, after completion of the loop, perform regression analysis on the operating statistics gathered during execution of the loop. In an implementation, the instructions, when executed, may, for example, cause the computing device to gather a second set of one or more operating statistics of the computing device after scheduling the wake-up event and prior to occurrence of the wake-up event.

In another general aspect, an apparatus includes a processor and a non-transitory recordable storage medium having instructions recorded thereon. The apparatus is configured, as result of executing the instructions, to automatically schedule a wake-up event, where occurrence of the wake-up event causes the computing device to transition from a low power state to an active power state; initiate, after scheduling the wake-up event, a transition of the computing device from the active power state to the low power state; initiate the transition of the computing device from the low power state to the active power state in response to occurrence of the wake-up event; gather a first set of one or more operating statistics of the computing device in response to the transition of the computing device from the low power state to the active power state in response to occurrence of the wake-up event; and perform an analysis of the first set of one more operating statistics to determine one or more performance attributes of the computing device associated with the transitions between the low power state and the active power state.

Implementations may include one or more of the following features. For example, the apparatus may include a measurement module that is configured to gather the first set of one or more operating statistics. The apparatus may include a power manager configured to transition the apparatus between the low power state and the active power state. The apparatus may be further configured, as result of executing the instructions, to gather a second set of one or more operating statistics of the computing device after scheduling the wake-up event and prior to occurrence of the wake-up event, and generate a set of one or more comparison statistics based on the first set of operating statistics and the second set of operating statistics.

In another general aspect, an apparatus includes a processor and a non-transitory recordable storage medium having instructions recorded thereon. The apparatus is configured, as result of executing the instructions, to establish a number of loop iterations to be performed by the computing device. The apparatus is further configured, as a result of executing the instructions, to, for each loop iteration, automatically schedule a wake-up event, wherein occurrence of the wake-up event causes the computing device to transition from a first power state to a second power state; initiate a transition of the computing device from the second power state to the first power state; initiate the transition of the computing device from the first power state to the second power state in response to occurrence of the wake-up event; gather a set of one or more operating statistics of the computing device in response to the transition of the computing device from the first power state to the second power state; modify a loop iteration counter to indicate completion of a loop iteration; and determine, based on the loop iteration counter and the number of loop iterations to be performed, if execution of the loop is complete. The apparatus is further configured, as a result of executing the instructions, to, after completion of the loop, perform regression analysis on the operating statistics gathered during execution of the loop.

Implementations may include one or more of the following features. For example, the apparatus may include a measurement module configured to gather, for each loop iteration, the set of one or more operating statistics. The apparatus may include a power manager configured to transition the apparatus between the low power state and the active power state.

DETAILED DESCRIPTION

Figure 1:
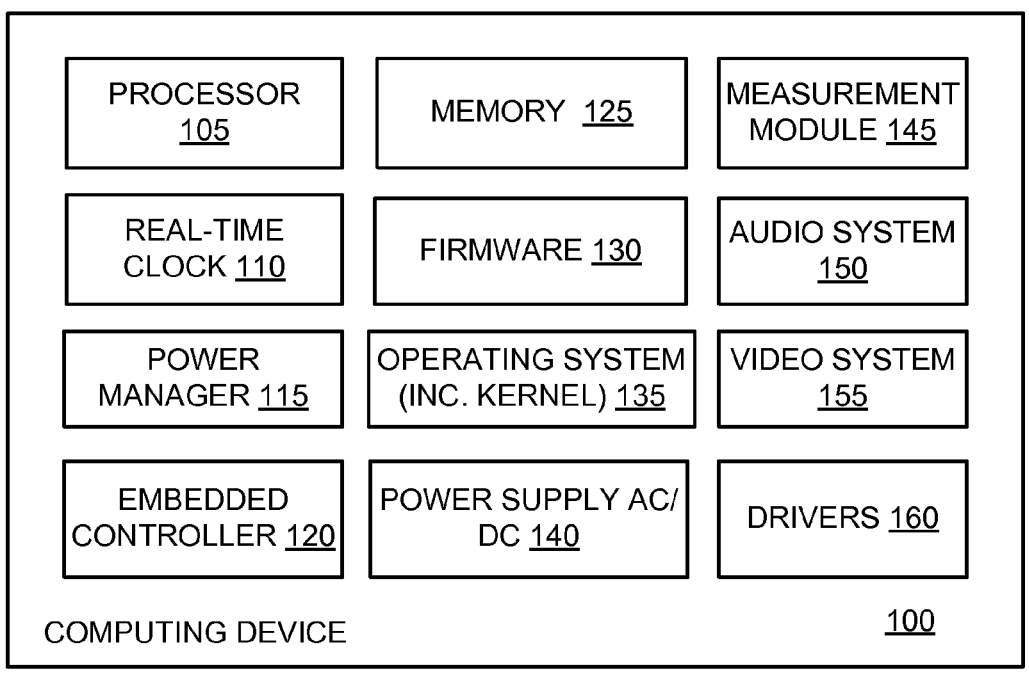
FIG. 1 is a block diagram illustrating a computing device in accordance with an example embodiment.

FIG. 1 is a block diagram of a computing device 100 in accordance with an example embodiment. The computing device 100, as illustrated in FIG. 1, includes a number of modules, components and/or devices. It will be appreciated that the specific elements illustrated in FIG. 1 are shown for illustrative purposes and by way of example. In other embodiments, a computing device may include fewer elements, additional elements or may substitute certain elements with other elements. Also, the various elements of the computing device 100 may be operationally coupled with one another in a number of appropriate manners. For instance, a processor 105 of the computing device 100 may be operationally coupled with one or more of the other elements of the computing device 100 using a bus, or multiple busses.

As shown in FIG. 1, the computing device 100 includes the processor 105, a real-time clock (RTC) 110, a power manager 115, an embedded controller (EC) 120, memory 125, firmware 130, an operating system 135 (including an operating system kernel), an AC/DC power supply 140, a measurement module 145, an audio system 150, a video system 155, and drivers 160. In some embodiments, two or more of these elements may be combined into a single element. For example, the power manager 115 may be implemented as part of the operating system 135. In other embodiments, a single element of the computing device 100 may be implemented as multiple elements, or may include multiple sub-elements. For instance, the memory 125 may be implemented as separate volatile (e.g., random-access memory) and non-volatile memory (e.g., a hard disk drive and/or a flash memory drive) elements, or as sub-elements of the memory 125. The particular arrangement of elements of a computing device will depend on the specific embodiment.

The computing device 100 may be configured to operate and/or implement a number of different power states. Such power states may include one or more active power states, a suspend-to-RAM power state, a suspend-to-disk power state and/or a powered-off power state, as some examples.

The active power states in the computing device 100 may include a low-power active state, which may be used when the computing device 100 is operating using battery (DC) power, and which prolongs battery life. In the low-power active state, the computing device 100 may operate at a reduced processing speed, operate at a reduced voltage and operate with brightness of a display device at a lower level as compared with a full-power active state for the computing device 100. In the full-power active state, the computing device 100 may operate at a higher processing speed, operate at a higher voltage and operate with a higher display device brightness level, which may boost the performance of the computing device 100 relative to its performance when operating in the low-power active state, and which may be used when the computing device is operating using alternating-current (AC) power, such as using an AC-to-DC converter that is plugged into a wall outlet. In some embodiments, the specific parameters of each power state, active or otherwise, may be selected by a user (e.g., such as by using features of the operating system 135 and/or the power manager 115).

The suspend-to-RAM power state of the computing device 100 may be referred to as "Standby," "Sleep," or "Suspend," depending on the particular embodiment In such a low power state, aside from powering the random access memory ("RAM") that is required to restore the computing device's 100 operating state, the computing device 100 attempts to reduce or cut power to all unneeded parts of the machine (e.g., the hard disk(s) stop spinning, the display device is placed into a dark or low power state, and peripheral devices are de-powered). Such a low power state often is called Standby (for computing devices running a Microsoft Windows 95-Server 2003 operating system), or is called Sleep (for computing devices running an Apple operating system or a Windows Vista, Windows 7, Windows Server 2008 operating system), or Suspend (for computing devices running a Linux operating system). In such a state, the processing functions of the computing device 100 are powered down, and some small amount of power is used to preserve the contents of RAM and support waking up the computing device from the low power state into an active power state. When the computing device 100 is placed into the Standby, Sleep, or Suspend to RAM state, it typically consumes less than about 20% of the total power than is consumed when the computing device 100 is operating in an active power state.

The suspend-to-disk power state of the computing device 100 may be referred to as "Hibernate," or "Safe Sleep" or "suspend-to-disk," depending on the particular embodiment. In such a state the contents of the computing device's 100 RAM are written to non-volatile storage such as a hard disk, as a file or on a separate partition, before powering off the computing device 100. When the computing device 100 is restarted or resumed from the suspend-to-disk state, it reloads the data that had been written to the non-volatile memory and is, thus, restored to the state it was in when the suspend-to-disk power state was invoked. To enable the suspend-to-disk power state, the hard disk must have sufficient free space to store all non-replaceable contents of RAM. Such a low power state often is called Hibernate (for computing devices running a Microsoft Windows 95-Server 2003, a Microsoft Vista operating system or a Windows 7 operating system), Safe Sleep (for computing devices running an Apple operating system), or suspend-to-disk (for computing devices running a Linux operating system). When the computing device 100 is placed into the suspend-to-disk power state, it typically consumes about as much power as is consumed when the computing device 100 is powered off.

In an example embodiment, the computing device 100 may be configured to gather and analyze data (hereafter "operating statistics") related to operation of the computing device 100 before, during and after transitions between power states. For example, the measurement module 145 may be configured to gather (and analyze) such operating statistics, such as in the manners described herein. The measurement module 145 may include hardware, firmware and/or software that are configured to gather and analyze the operating statistics to determine one or more performance attributes of the computing device 100. Such performance attributes may include time period measurements, energy consumption measurements, and identification of functionality issues for components of the computing device 100 associated with power state transitions, as some examples. The measurement module 145 may work in conjunction with other elements of the computing device 100 to transition between power states and gather/analyze the operating statistics, such as system clocks and timers, power supplies and batteries, among a number of other components. In some embodiments, the measurement module 145 may only gather operating statistics and analysis of those statistics may be performed by other entities, either included in, or external to the computing device 100.

In the computing device 100, the power manager 115 may be configured to manage the process of transitioning the computing device 100 from one power state to another. For example, the power manager 115 may signal one or more elements of the computing device 100 to indicate a desired change in power state (e.g., as instructed by the measurement module 145) to initiate a transition between power states. The power manager 115 may be further configured to monitor the various elements of the computing device 100 to ensure that they complete any operations or functions associated with a transition between power states of the computing device 100. For example, if the computing device 100 is transitioning from an active power state to a suspend state or to off state, the power manager 115 may monitor the various elements of the computing device 100 to ensure that any housekeeping operations (e.g., saving operating state information (e.g., for use when returning the computing device 100 to an active power state)) are completed before allowing the computing device 100 to enter the suspend state or the off state.

The measurement module 145 may also work in conjunction with the RTC 110 and other elements of the computing device 100 to facilitate transitions between power states. For example, the measurement module 145 may communicate with the RTC 110 to automatically (without user intervention) schedule a transition event (e.g. in the form of an RTC alarm). Automatic scheduling may be accomplished by an instruction, or instruction included in a test script that is executed on the computing device 100, or using a number of other appropriate techniques. In such an approach, occurrence of the transition event (e.g., the RTC alarm) may result in the computing device transitioning from one power state to another power state. For instance, an automatically scheduled transition event may be a wake-up event that causes the computing device 100 to transition from a low power state (e.g., a suspend state or a power-off state) to an active power state.

In other implementations, a number of other techniques could be used to initiate a power state transition (e.g., low power state to active power state, or vice versa). For instance, the computing device could include one or more roll-over timers that may be configured to remain active regardless of the power state of the computing device 100. In such an approach, a first roll-over timer could be used to initiate, at each roll-over of the first timer, a transition of the computing device 100 from an active power state to a low power state, while a second roll-over timer could be used to initiate, at each roll-over of the second timer, a transition from a low power state to an active power state. Such roll-over timers could be synchronized with each other and be operationally coupled with the measurement module 145 to coordinate gathering operating statistics, such as in the fashions described herein. In still other embodiments, other approaches for initiating power-state transitions may be used. For instance, the computing device 100 could be configured to transition between power states in response to an externally generated signal or signals.

In one example, the measurement module 145 may communicate with the RTC 110 to automatically schedule an RTC alarm while the computing device 100 is operating in an active power state. In an example embodiment, the measurement module 145 may automatically schedule the RTC alarm based on a system clock or timer of the computing device 100. The measurement module 145 may then communicate with the power manager 115 to initiate a transition of the computing device 100 from the active power state to a suspend state or to an off power state. The power manager 115 may then monitor and manage an orderly transition from the active power state to the suspend state or the off state. Such a transition may include a series of suspend and/or power-off transition processes.

For instance, the power manager 115 may determine that the computing device 100 is to enter the suspend state or the off state. Once the power manager 115 has determined that the computing device 100 is to enter the suspend state or the off state, the power manager 115 may save state information to RAM and/or disk, as well as perform appropriate other operations to prepare the computing device 100 for entering the suspend state or the off state (such as instructing components of the computing system 100 to prepare to enter the suspend state or the off state). Once the power manager 115 has prepared the computing device 100 for entering the suspend state or the off state, the power manager 115 may direct the operating system kernel (included in the operating system 135) to transition the computing device 100 to the suspend state or the off state. This may include saving additional state information to RAM and/or disk and/or performing other operations. Once the operating system kernel has completed its suspend transition process, the operating system kernel may direct the system firmware 135 to transition to the suspend state or the off state. This may include shutting down components of the system, such as the audio system 150, the video system 155, a chipset and/or performing other operations to prepare the computing device 100 for entering the suspend state or the off state. Once the firmware 130 has completed its suspend transition process, the firmware 130 may direct the EC 120 (e.g., firmware of the EC 120) to transition to the suspend state or the off state. This may include completing the transition of the computing device 100 to the suspend state or the off state, and recording (e.g., in non-volatile memory in the EC 120) a time reading indicating the time the transition was completed. As is discussed in further detail below, this time reading may be used as an operating statistic to calculate various time periods associated with transitions between power states. Where appropriate, such suspend or power-off transition processes may be conducted in parallel, rather than serially. In some embodiments, the functionality of the EC 120 may be implemented by the firmware 130.

In this example, the computing device 100 may remain in the suspend state or the off state, until occurrence of the transition event (e.g., an RTC alarm, or other stimulus). Occurrence of the transition event may indicate to the computing device 100 that a transition from the suspend state or from the off state to an active power state (e.g., either a low-power active state or a full-power active state) is desired. In like fashion as the transition from the active power state to the suspend state or to the off state, the transition from the suspend state or the off state to an active power state may be implemented as a series of resume transition processes. For example, the computing device 100 may resume operating in an active state by implementing resume transition processes in an opposite order to the order of the suspend or the power-off transition processes discussed above. For instance, in response to occurrence of the transition event, the computing device 100 may implement an EC resume process, a firmware resume process, an operating system kernel resume process and an operating system resume process. In like fashion as the suspend and power-off transition processes, the resume transition processes may be implemented in series or in parallel, as is appropriate for the particular embodiment.

Such resume transitions processes may include restoring operational state information that was saved, for example, during the suspend transition processes or during the power-off transition processes. The various hardware, software and firmware elements of the computing device 100 may also resume active operation as part of the resume transition processes. For instance, the processor 105, the memory 125 the audio system 150, the video system 155 and the drivers 160 would resume normal or active operation as part of the resume transition processes.

As discussed above, the measurement module 145 (alone or in conjunction with other elements of the computing device 100) may be configured to gather and analyze operating statistics for the computing device 100. Such operating statistics may be gathered before, during and after transitions between power states. Using the techniques described herein, operating statistics may be gathered for use in product development. For instance, such operating statistics may be used for regression testing (e.g., to assess operational stability of the computing device 100). Operating statistics may be compared to historical operating statistics for previous development versions of a computing device (e.g., to determine if one or more aspects of the development process have resulted in respective improvements or degradations in performance of the computing device). Such determinations may be made by determining if there are any statistically significant variations (e.g., more than two standard deviations) for operating statistics for a current version of a computing device as compared to historical operating statistics The operating statistics may also be used to determine various time periods (performance attributes) associated with suspend, power-off, and resume operations. For example, the operating statistics may be used to determine a period of time taken to transition from an active power state to a suspend state or to an off power state. The operating statistics may also be used to determine a period of time taken to transition from a suspend state or from an off state to an active power state. Furthermore, the operating statistics may be used to determine respective periods of time taken to execute each suspend, power-off or resume transition process and/or respective periods of time taken for respective hardware, software, and firmware components of the computing device 100 to resume normal operation after the occurrence of a transition event, such as the RTC alarm transition event (or other stimulus) discussed above. As an example, the operating statistics may be used to determine how long it takes each of the drivers 160 to become functional after occurrence of the transition event. The measurement module 145 may be configured to monitor each element of the computing device 100, so as to enable the measurement module 145 to determine such time periods.

The operating statistics may also be used to calculate an amount of energy consumed by the computing device 100. For example, the measurement module 145 may gather respective battery condition information before suspending the computing device 100 and after resuming the computing device 100 to an active power state. Based on the gathered battery condition information, the measurement module 145 may determine an amount of energy consumed during the suspend power state.

In an example embodiment, such energy consumption determinations may be made using information obtained by the measurement module 145 from a battery included in the power supply 140. For instance, the battery may include circuitry that allows the computing device 100 (e.g., using the measurement module 145) to obtain remaining charge measurements, a full charge capacity that the battery was designed for, a last full charge capacity of the battery and an "instantaneous" current draw measurement for the battery, which may be an average current draw over a predetermined period of time, such as a previous 30 seconds of operation, for example. In an example embodiment, the battery may be configured to allow the computing device 100 to read a current charge level of the battery (e.g., in amp-hours (Ah)) from a register that is included in the battery. The computing device 100 may read the battery's charge level at various points in time (e.g., prior to suspending the computing device 100 and after resuming the computing device 100) and compare those readings to determine an amount of energy consumed by various transitions or processes in the computing device 100. A time (e.g., wall time) of each battery charge measurement may also be gathered by the computing device 100. Using these times in conjunction with the associated battery charge measurements, rates of energy consumption for different states and/or transitions of the computing device 100 may be determined. Depending on the particular arrangement, such energy consumption and energy consumption rate determinations may, or may not, include determinations of energy consumed during the power state transitions. However, because the amount of energy consumed during power state transitions is small, externally connected precision power meters may be used to make such measurements.

Figure 2:
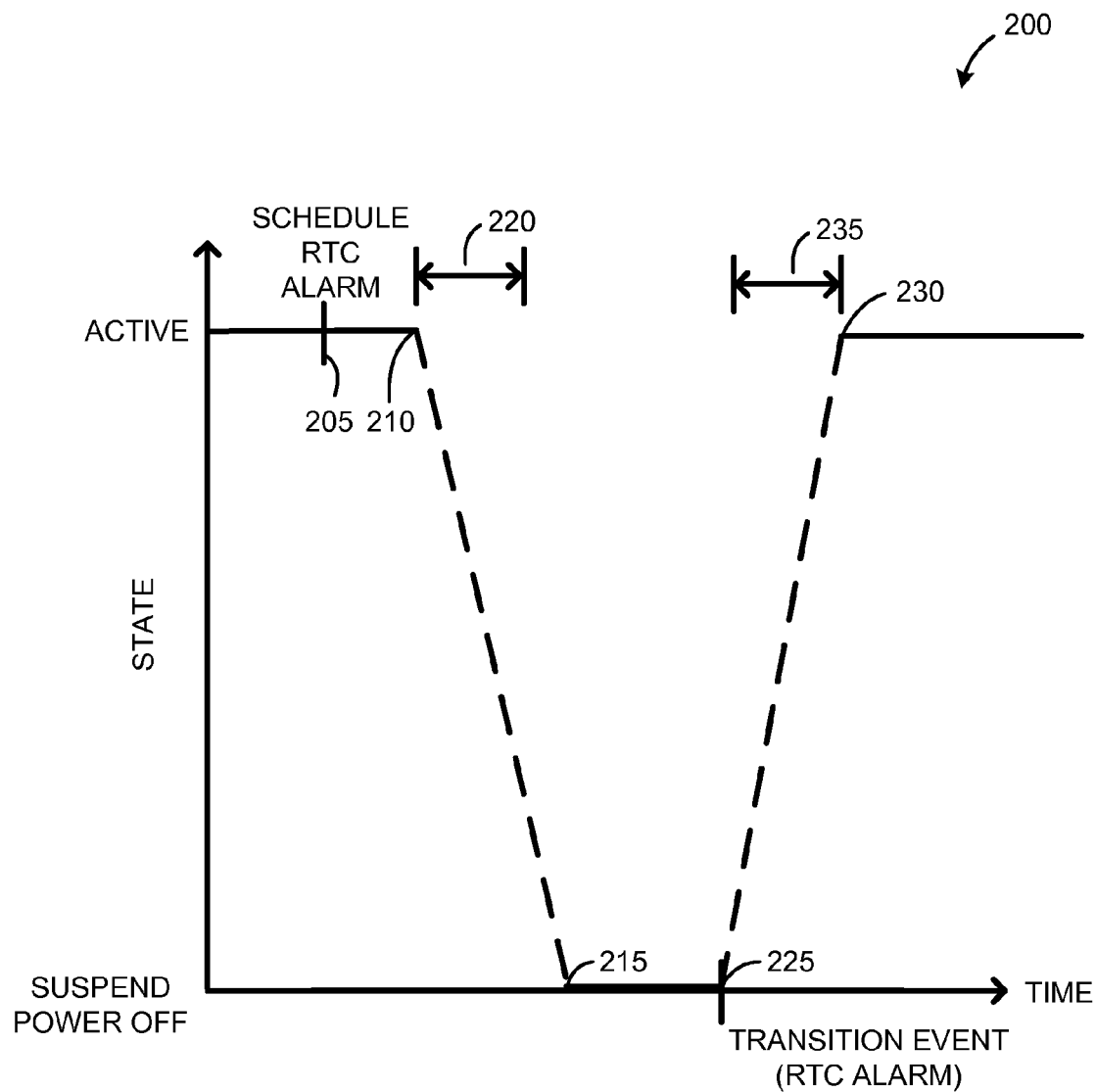
FIG. 2 is a timing diagram illustrating timings of a computing device in accordance with an example embodiment.

FIG. 2 is a timing diagram 200 illustrating timings of a computing device in accordance with an example embodiment. The timing diagram 200 illustrates an approach for gathering operating statistics for a computing device, such as the computing device 100 illustrated in FIG. 1.

As shown in FIG. 2, the x-axis of the timing diagram 200 represents time and the y-axis represents an operating, or power state of the computing device. As shown on the y-axis in the timing diagram 200, a suspend or power-off state and an active state are illustrated. These states are shown by way of example, and a number of other states are possible, such as the states illustrated in FIGS. 3A and 3B. In the timing diagram 200, transitions between the suspend or power-off state and the active state are indicated by broken lines. For the particular arrangement shown in FIG. 2, operating statistics for a computing device may be determined using, or based on, the timing information shown in the timing diagram 200.

In the timing diagram 200, automatic scheduling of a transition event is shown at time 205, at which point the computing device is operating in the active power state. In like fashion as was previously discussed, the transition event in the timing diagram 200 may be implemented as an RTC alarm or event. In other embodiments, other approaches for triggering power-state transitions may be used, such as those described above. As illustrated in FIG. 2, the RTC alarm is scheduled to occur at a point later in time than the time 205. In the timing diagram 200, the RTC alarm (transition event) is scheduled to occur at time 225.

At time 210 in the timing diagram 200, a transition from the active power state to the suspend or power-off power state is initiated in the computing device. This transition may be initiated in a number of ways, such as using the techniques described herein. For instance, a measurement module may communicate with a power manager of the computing device to initiate the transition from the active power state to the suspend or power-off power state. At time 210, the computing device may be configured to record a current time reading for the computing device 100. For example, the time 210 may be read using a system clock, a timer or the RTC of the computing system 100, as some examples. This reading (at time 210) may be used as part of the process of gathering operating statistics for the computing device.

Between the time 210 and time 215 in the timing diagram 200, the computing device may implement a suspend process or a power-off process, as appropriate for the particular situation. The suspend or power-off process may be implemented in a number of fashions, such as under the control of a power manager, for example. At the time 215 in the timing diagram, the computing device may be configured to record another time reading, such as from a system clock, timer or the RTC 110 of the computing device 100. The computing device may then use the time reading at the time 215 and the time reading at the time 210 to calculate a time period measurement corresponding with an amount of time the computing device takes to complete its suspend process or its power-off process. This suspend or power-off time is represented in the timing diagram 200 as the time period 220.

As noted above, the transition event (e.g., RTC alarm or other stimulus) occurs at the time 225 in the timing diagram 200. In contrast with the times 210 and 215, the computing device may not record a time reading at the time 225, because the time 225 corresponds with the time at which the transition event (alarm) was scheduled.

Between the time 225 and time 230 in the timing diagram 200, the computing device may implement a resume or boot process, as appropriate for the particular situation. The resume or boot process may be implemented in a number of ways, such as described herein. At the time 230 in the timing diagram, the computing device may be configured to record another time reading. The computing device may then use the time at which the RTC alarm was scheduled (time 225) and the time reading at the time 230 to calculate a time period measurement corresponding with an amount of time the computing device takes to complete it resume or boot process. The resume or boot time is represented in the timing diagram 200 as the time period 235.

In addition to the timing measurements discussed above, the computing device (e.g., using a measurement module or other module) may also collect other operating statistics based on the timing relationships illustrated in FIG. 2. For instance, the computing device may be configured to record battery condition measurements at the times 210 and 230. Those battery condition measurements may be used to generate a calculation of a total amount of energy consumed by the computing device during: (1) the suspend or power-off process (time 210 to time 215); the suspend or power-off state (time 214 to time 225); and (3) the resume or boot process (time 225 to time 230).

As another example, the computing device may be configured to record respective operational statuses of hardware, software and firmware components of the computing device just prior to the time 210 and then record corresponding operational statuses for those components just after the time 230. Such operating statistics may be used to determine whether the suspend or power-off process, suspend or power-off state and the resume or boot process cause any functionality issues for the components of the computing device. Such operational statuses may be obtained in a number of fashions. For instance, a measurement module of the computing device may poll the components of the computing device to determine their functional status. Alternatively, the measurement module may communicate a status request signal to each of the components of the computing device that are of interest. If a particular component does not respond to the request, the measurement module may conclude that that particular component is not operating properly. In other embodiments, other operating statistics may be gathered by a computing device in a similar manner as the techniques described above.

Figure 3A:
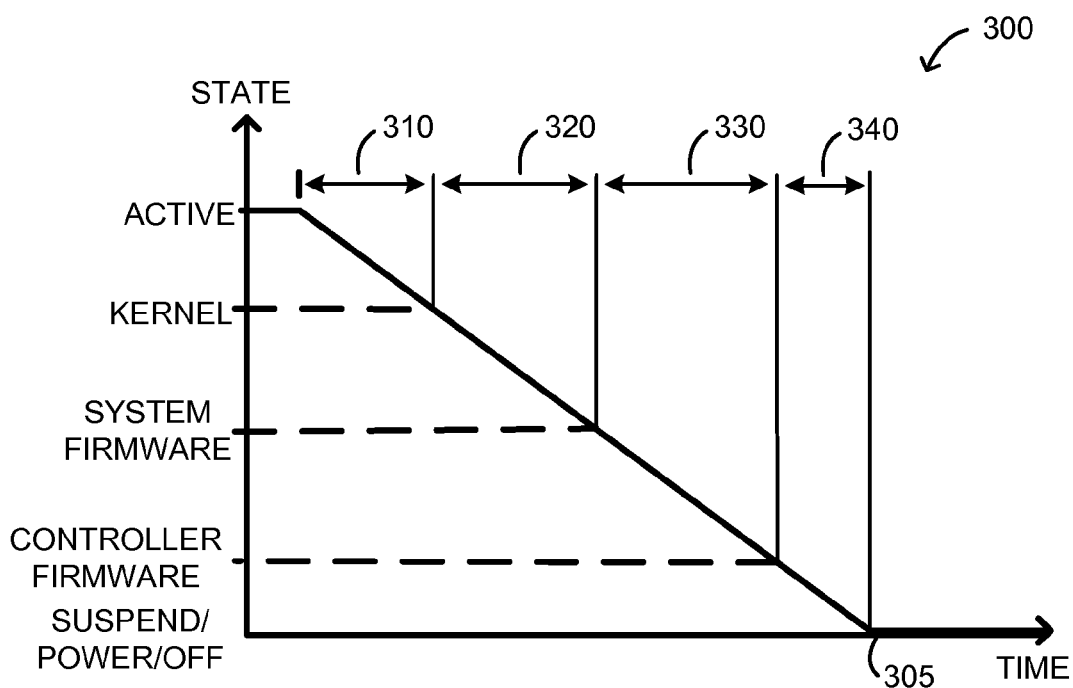
FIGS. 3A and 3B are timing diagrams illustrating timings of a computing device in accordance with an example embodiment.
Figure 3B:
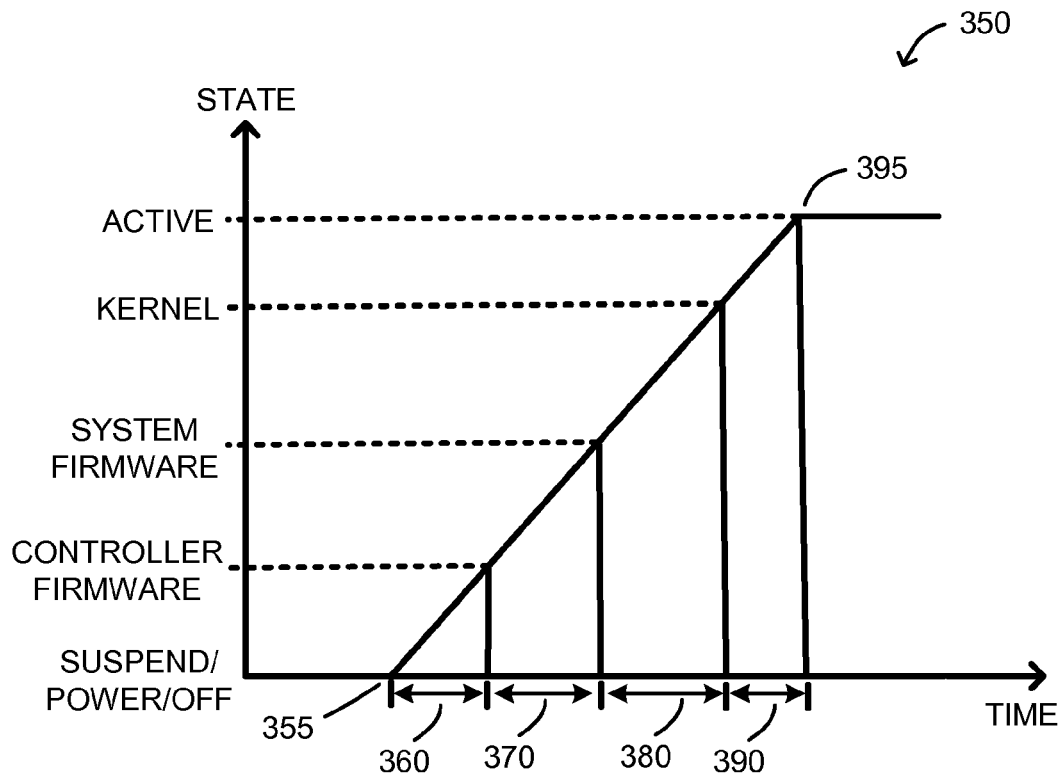

FIGS. 3A and 3B are timing diagrams 300 and 350, respectively, which illustrate timings of a computing device in accordance with an example embodiment. The timing diagrams 300 and 350 illustrate approaches for gathering operating statistics for a computing device, such as the computing device 100 illustrated in FIG. 1.

The timing diagram 300 illustrates an approach for gathering operating statistics for a suspend or power-off process. In like fashion as the timing diagram 200 shown in FIG. 2, the x-axis of the timing diagram 300 represents time and the y-axis of the timing diagram 300 represents power/operating state of a computing device. The timing diagram 300 includes the power/operating states shown in the timing diagram 200 (a suspend or power-off state and an active state), as well as a controller firmware state, a system firmware state and a kernel state. These states are shown for purpose of illustration and a number of other states are possible.

In the example shown in FIGS. 3A and 3B, each state corresponds with a portion of a suspend or power-off process where a different component of a computing device has primary control of the computing device. For instance, in the active state, the computing device would be under primary control of an operating system. In the kernel state, the computing device would be under primary control of an operating system kernel. In the system firmware state, the computing device would be under primary control of system firmware. In the controller firmware state, the computing device would be under primary control of firmware of an embedded controller of the computing device. In the suspend or power-off state, the computing device would be idle.

The points noted on the y-axis of the timing diagram 300, for this example, correspond with control transfer points, where primary control of the computing device is passed from one component of the computing device to another component of the computing device. In some embodiments, the states may overlap while control is being passed from one component to another. In such an arrangement, additional timing relationships may be used to gather operating statistics for a computing device. For instance, additional or alternate time readings may be taken that correspond with the start and completion of a respective suspend or power-off process for each state.

Using the timing relationships shown in FIG. 3A, a computing device may gather operating statistics corresponding with each state for a suspend or power-off process. For example, time readings may be recorded at each transfer control point shown in the timing diagram 300, as well as at the completion of the suspend or power-off process at time 305. These time readings may then be used to calculate time period measurements for each portion of a suspend or power-off process. For instance, the time period 310 represents a period of time the computing device takes to complete an operating system suspend or power-off process and transfer control to an operating system kernel. The time period 320 represents a period of time the computing device takes to complete an operating system kernel suspend or power-off process and transfer control to system firmware. The time period 330 represents a period of time the computing device takes to complete a system firmware suspend or power-off process and transfer control to controller firmware. The time period 340 represents a period of time the computing device takes to complete a controller firmware suspend or power-off process and complete the overall suspend or power-off process.

Referring now to FIG. 3B, the timing diagram 350 illustrates an approach for gathering operating statistics for a resume or boot process. In like fashion as the timing diagram 300 illustrated in FIG. 3A, the x-axis of the timing diagram 300 represents time and the y-axis represents power/operating state of a computing device. The y-axis of the timing diagram 350 includes the same control transfer points as the timing diagram 300 of FIG. 3A. Accordingly, for purposes of brevity, those control transfer points are not described again in detail here. However, it will be appreciated that the states shown in FIG. 3B, in like fashion as discussed with respect to FIG. 3A, may overlap while control is being passed from one component to another. In such an arrangement, additional timing relationships may be used to gather operating statistics for a computing device. For instance, additional or alternate time readings may be taken that correspond with the start and completion of each respective resume or boot process for each state.

In the timing diagram 350, the time 355 may correspond with the occurrence of a transition event (e.g., an RTC alarm or other approach), such as those previously described. As discussed above, a time reading may not be taken at the time 355, as part of gathering operating statistics for the computing device 100, as the time 355 corresponds with the time at which the computing device automatically scheduled the transition event. Therefore, such a time reading would be redundant in this situation.

Using the timing relationships shown in FIG. 3B, a computing device may gather operating statistics corresponding with each state of the timing diagram 350 for a resume or boot process. For example, time readings may be recorded at each of the transfer control points shown in the timing diagram 300, as well as at the completion of the resume or boot process at time 395. These time readings may then be used to calculate time period measurements for each portion of a resume or boot process. For instance, the time period 360 represents a period of time the computing device takes to complete an embedded controller resume process and transfer control to system firmware. The time period 370 represents a period of time the computing device takes to complete a system firmware resume or boot process and transfer control to an operating system kernel. The time period 380 represents a period of time the computing device takes to complete an operating system kernel resume or boot process and transfer control to an operating system. The time period 390 represents a period of time the computing device takes to complete an operating system resume or boot process and to resume operating in the active power state.

Accordingly, the timing relationships shown in FIG. 3B may be used to determine a first time period measurement corresponding with a time period from a transition event until an embedded controller of the computing device becomes operational or has completed its resume or boot process. The timing relationships shown in FIG. 3 also may be used to determine a second time period measurement corresponding with a time the embedded controller of the computing device becoming operational until system firmware of the computing device becomes operational (e.g., completion of the system firmware resume or boot process). The timing relationships shown in FIG. 3B also may be used to determine a third time period measurement corresponding with a time period from the system firmware becoming operational until an operating system kernel of the computing device is operational (e.g., completion of an operating system kernel resume or boot process). The timing relationships shown in FIG. 3B also may be used to determine a fourth time period measurement corresponding with a time period from the operating system kernel becoming operational until an operating system of the computing device becomes operational and the computing device is in an active power state (e.g., completion of an operating system resume or boot process). In example embodiments, an operating system may include system software and user-space processes that are not part of a corresponding operating system kernel.

Figure 4:
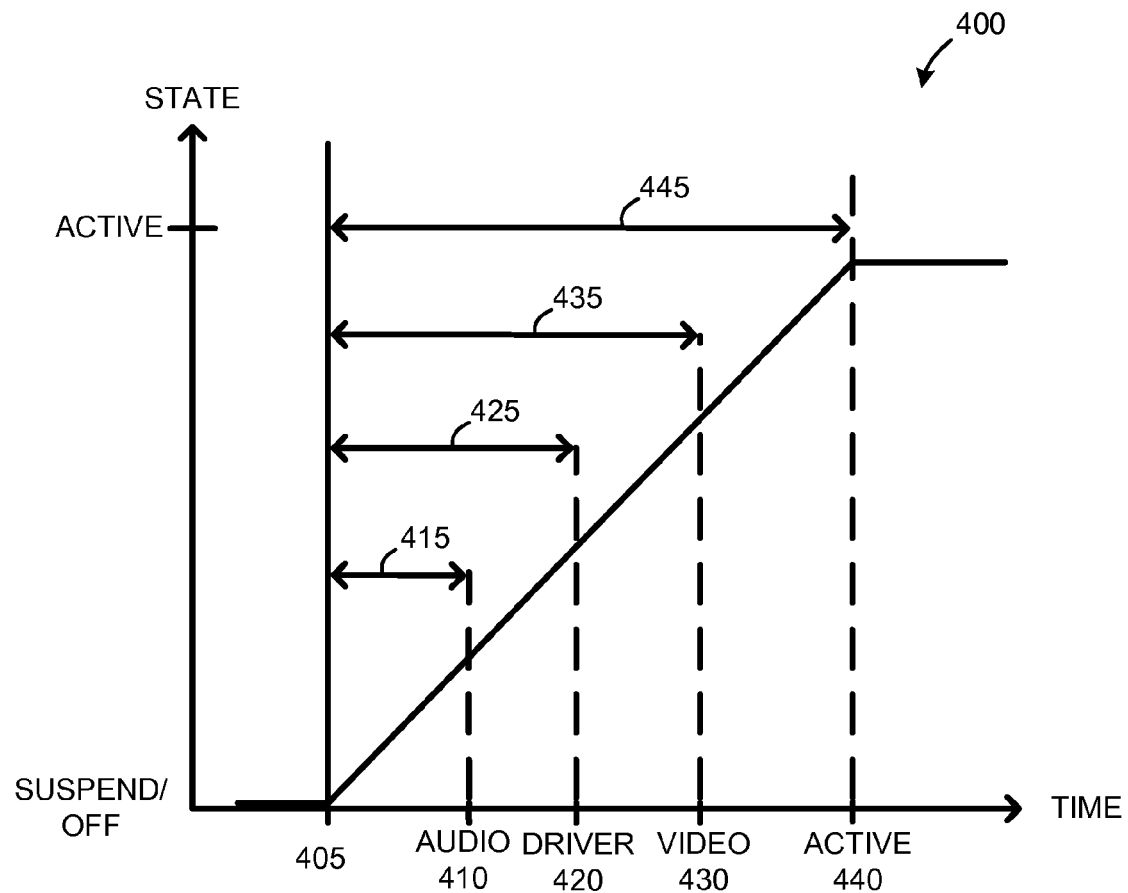
FIG. 4 is a timing diagram illustrating timings of a computing device in accordance with an example embodiment.

FIG. 4 is a timing diagram 400 illustrating timings of a computing device in accordance with an example embodiment. The timing diagram 200 illustrates an approach for gathering operating statistics for a computing device, such as the computing device 100 illustrated in FIG. 1.

The timing relationships shown in the timing diagram 400 may be used to gather operating statistics for startup times of individual components of a computing device, such as during a resume or boot process after occurrence of a transition event. In like fashion as the timing diagrams 200, 300 and 350, the x-axis of the timing diagram 300 represents time and the y-axis represents power/operating state of the computing device. As with the timing diagram 200, the y-axis of the timing diagram 400 illustrates only a suspend or power-off state and an active state.

In the timing diagram, time 405 corresponds with the occurrence of a transition event, such as described herein. Time 410 corresponds with a time when an audio system of a computing device indicates (e.g., to a measurement module) that it is operational. Time 420 corresponds with a time when a given driver of the computing device indicates that it is operational. The time 430 corresponds with a time where a video system of the computing device indicates that it is operational. The time 445 corresponds with a time when the computing device has resumed operating in the active power state. The components represented on the x-axis in FIG. 4 are given by way of example and a similar approach can be employed to determine startup times for other components or elements of a computing device. Furthermore, the times shown on the x-axis of FIG. 4 are shown for purposes of illustration. Actual startup times for components of a given computing device may occur in different orders, or may be determined in other fashions.

Using the timing relationships illustrated in the timing diagram 400, startup times of various components may be determined. For instance, the time period 415 corresponds with an amount of time it takes an audio system of a computing device to become operational after a transition event has occurred. The time period 425 corresponds with an amount of time it takes a given driver of the computing device to become operational after a transition event has occurred. The time period 435 corresponds with an amount of time it takes a video system of the computing device to become operational after a transition event has occurred. The time period 445 corresponds with an amount of time it takes the computing device to return to an active power state after a transition event has occurred.

Figure 5:
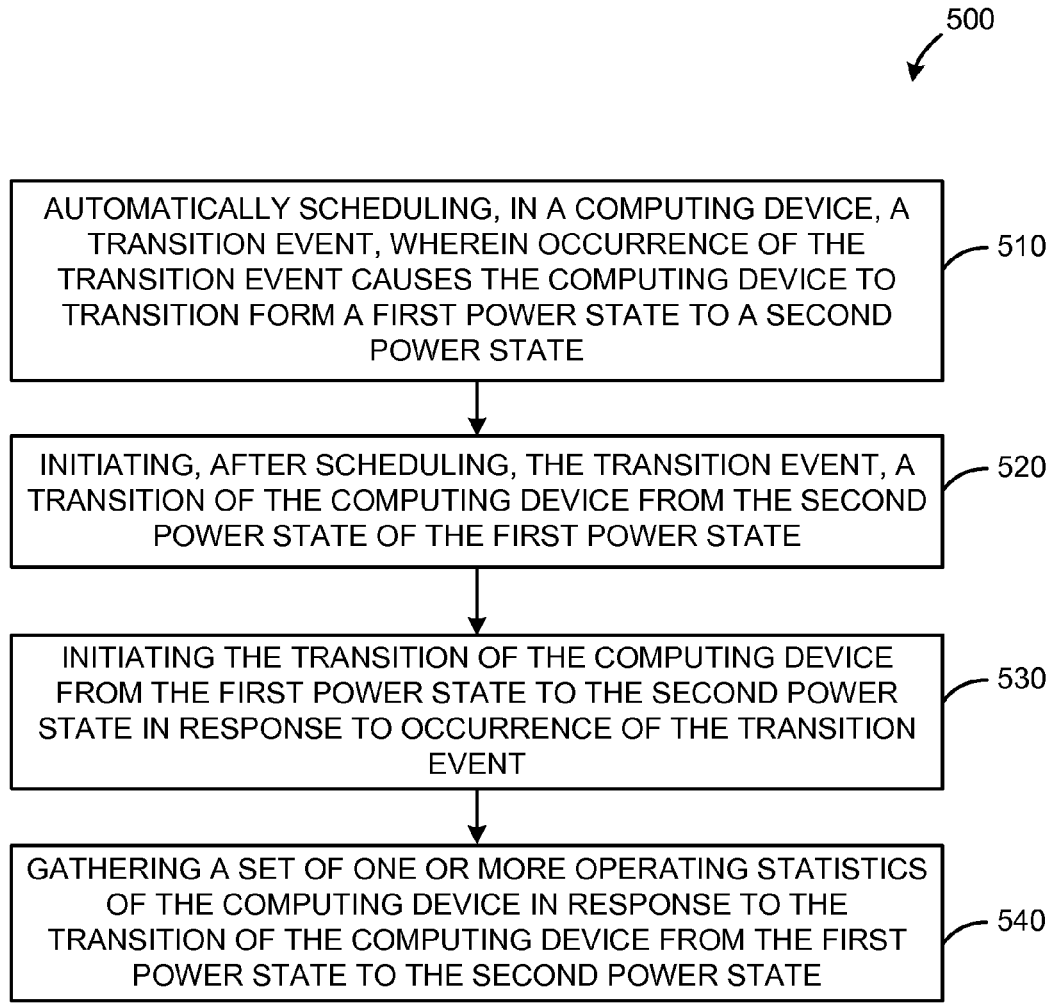
FIG. 5 is a flowchart illustrating a method in accordance with an example embodiment.

FIG. 5 is a flowchart illustrating a method 500 in accordance with an example embodiment. The method 500 may be implemented in the computing device 100 illustrated in FIG. 1, or in a number of other computing device configurations. Further, the method 500 may be implemented using the techniques described above with respect to FIGS. 1, 2, 3A, 3B and 4, for example.

As shown in FIG. 5, the method 500 includes, at block 510, automatically scheduling (without user intervention) a transition event. In some embodiments, other approaches for initiating a power state transition may be used, such as the techniques described herein. In like fashion as discussed above, occurrence of the transition event of block 510 may cause a computing device to transition from a first power state (e.g., a suspend state or a powered-off state) to a second power state (e.g., an active power state). As described above, the transition event may be scheduled as an RTC alarm or event, or may be indicated in a number of other fashions. At block 520, the method 500 includes, after scheduling the transition event, initiating a transition of the computing device from the second power state to the first power state. The transition from the second power state to the first power state may be initiated as a result of a measurement module (such as the measurement module 145 discussed) communicating with a power manager, such as in the fashion discussed above with respect to FIG. 1. In other embodiments, the transition of block 520 may be initiated using other approaches, such as such as a previously scheduled event, for example.

The method 500 further includes, at block 530, initiating the transition of the computing device from the first power state to the second power state in response to occurrence of the transition event. For instance, initiating the transition between the first power state and the second power state may include signaling occurrence of the transition event (e.g., occurrence of an RTC alarm) to an EC of the computing device. In such an arrangement, firmware of the EC may start a resume or boot process, where the resume or boot process transitions the computing device from the first power state (e.g., a suspend state or a powered-off state) to the second power state (e.g., an active power state). At block 540, the method 500 further includes gathering a set of one or more operating statistics of the computing device in response to the transition of the computing device from the first power state to the second power state. The operating statistics gathered at block 540 may include one or more of the operating statistics described above with respect to FIGS. 1, 2, 3A, 3B and 4. In other embodiments, the operation of block 540 may include gathering other operating statistics.

Figure 6:
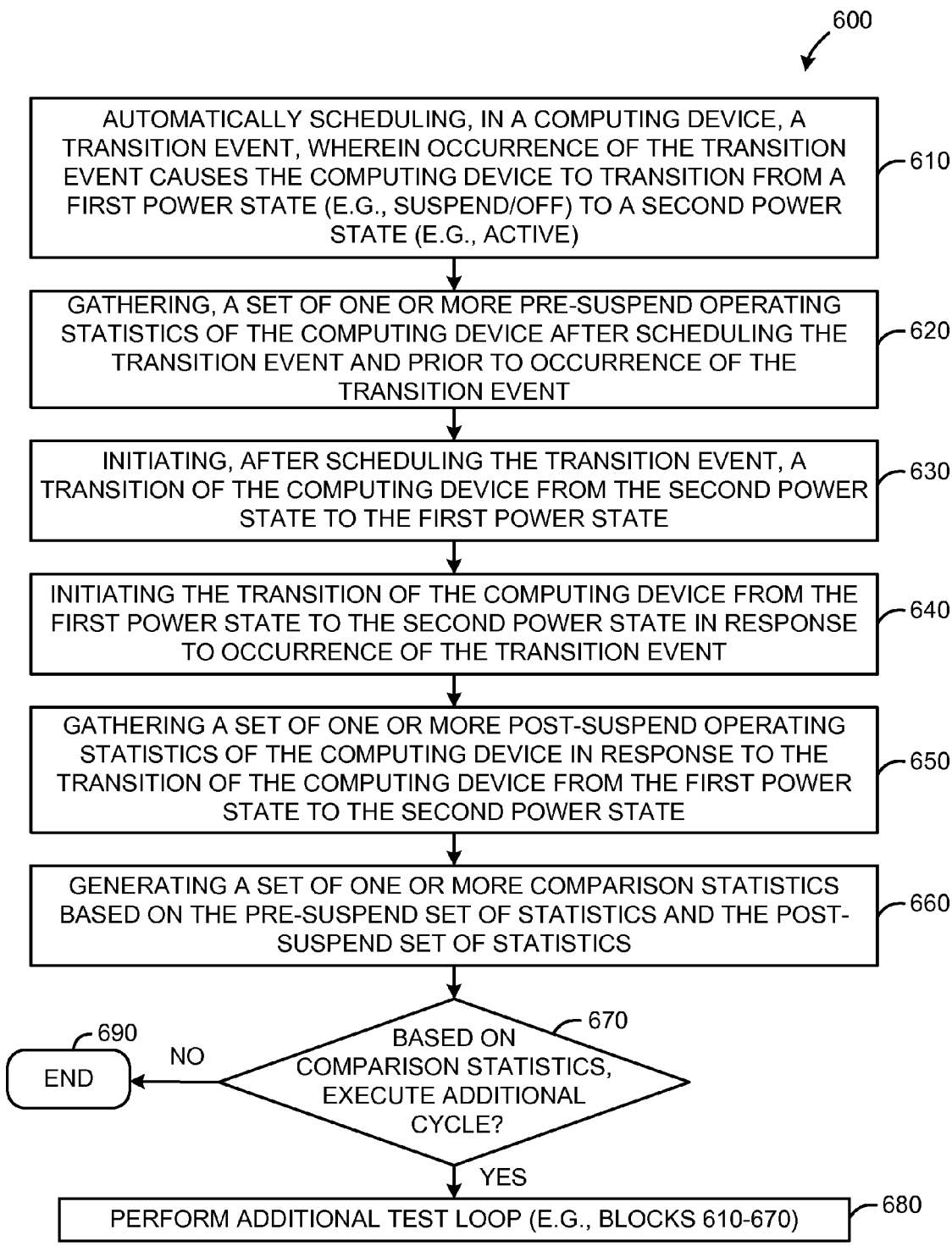
FIG. 6 is a flowchart illustrating a method in accordance with an example embodiment.

FIG. 6 is a flowchart illustrating a method 600 in accordance with an example embodiment. As with the method 500, the method 600 may be implemented in the computing device 100 illustrated in FIG. 1, or in a number of other computing device configurations. Further, the method 600 may be implemented using the techniques described above with respect to FIGS. 1, 2, 3A, 3B and 4. Also, the method 600 includes similar operations to operations of the method 500. For purposes of brevity, specific details of those operations discussed with respect to FIG. 5 are not discussed again with respect to FIG. 6.

As shown in FIG. 6, the method 600 includes, at block 610, automatically scheduling (without user intervention) a transition event for initiating a transition of a computing device from a first power state (e.g., a suspend state or a powered-off state) to a second power state (e.g., an active power state). As discussed above, other approaches for indicating a transition event are possible. At block 620, the method 600 further includes gathering a set of one or more pre-suspend or power-off operating statistics of the computing device after scheduling the transition event and prior to occurrence of the transition event. The pre-suspend or power-off operating statistics may be used in conjunction with post suspend or power-off operating statistics (which are gathered at block 650) to generate a set of one or more comparison statistics, such as time periods related to power state transitions, power consumption measurements and/or operational status comparisons for hardware, software and firmware components of the computing, among a number of other possible comparison statistics.

At block 630, the method 600 includes initiating a transition of the computing device from the second power state (e.g. an active power state) to the first power state (e.g., a suspend/powered-off power state), such as in the manners described herein. The method 600 further includes, at block 640, initiating the transition of the computing device from the first power state (e.g., the suspend/powered-off power state) to the second power state (e.g., the active power state) in response to occurrence of the transition event, such as in the fashions discussed herein.

At block 650, the method 600 still further includes gathering a set of one or more post suspend/powered-off operating statistics of the computing device in response to the transition of the computing device from the first power state to the second power state. At block 660, the method 600 includes generating a set of one or more comparison statistics based on the first set of statistics and the second set of statistics. As indicated above, the operation at block 660 may include calculating time periods associated with the power state transitions, determining an amount of power consumed during a time the computing device was in the first power state and/or comparisons of respective operational statuses of one or more hardware, software and/or firmware components of the computing device. In some embodiments, the comparison statistics may also include one or more of the pre-suspend or power-off operating statistics and/or one or more of the post-suspend or power-off operating statistics.

At block 670, the method 600 includes determining, based on the one or more comparison statistics, whether additional cycles of the operations of blocks 610-670 should be performed. Such a determination may be made in a number of fashions. For instance, the determination at block 670 may include determining whether one or more of the comparison statistics falls outside an expected statistical range for that particular operating statistic. In this situation, it may be determined, at block 670, that an additional cycle of the operations of blocks 610-670 should be performed.

The determination at block 670 may be done in a number of other manners as well. For instance, if it is determined that one or more elements of the computing device were operational at block 620 and are not operational at block 650, it may be determined, at block 670, that an additional cycle of the operations of blocks 610-670 should be performed.

If a determination is made at block 670 to perform additional cycles (test loops), the method 600 continues on to block 680 where another cycle of the operations 610-670 is performed. Depending on the particular embodiment, the operating statistics gathered at blocks 620 and 650 during additional cycles of the operations 610-670 may be combined with respective operating statistics that were previously gathered at those operations during previous cycles. In other situations, the operating statistics gathered at blocks 620 and 650 during additional cycles of the operations 610-670 may replace respective operating statistics that were previously gathered at those operations. If it is determined at block 670 that additional test loops are not to be performed, the method 600 continues to block 690 and the method 600 ends or terminates.

Figure 7:
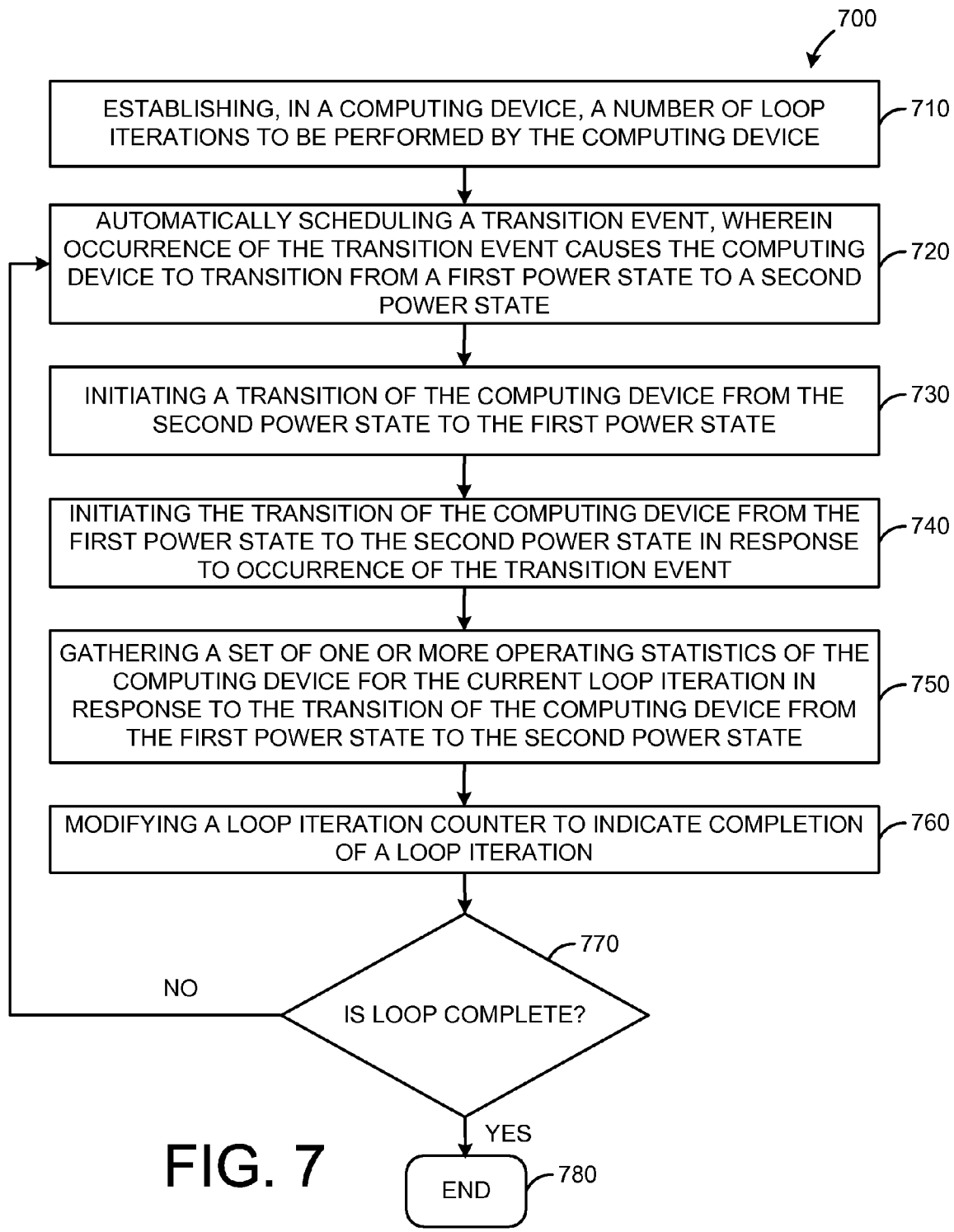
FIG. 7 is a flowchart illustrating a method in accordance with an example embodiment.

FIG. 7 is a flowchart illustrating a method 700 in accordance with an example embodiment. As with the methods 500 and 600, the method 700 may be implemented in the computing device 100 illustrated in FIG. 1, or in a number of other computing device configurations. Further, the method 700 may be implemented using the techniques described above with respect to FIGS. 1, 2, 3A, 3B and 4, for example. Also, the method 700 includes similar operations to operations of the methods 500 and 600. For purposes of brevity, specific details of those operations discussed with respect to FIGS. 5 and 6 are not discussed again with respect to FIG. 7.

The method 700 may be used, for example, to implement regression testing for a computing device, such as the computing device 100 shown in FIG. 1. For instance, the method 700 may be used to obtain operating statistics for a computing device over a number of loop iterations. The operating statistics gathered using the method 700 may be compiled, where the operating statistics gathered during each iteration of the loop are added to/combined with the operating statistics gathered during previously iterations of the loop. The combined statistics can then be used for regression analysis, such as to evaluate performance and stability of a computing device from which the operating statistics have been gathered.

As shown in FIG. 7, the method 700 includes, at block 710, establishing a number of loop iterations to be performed by a computing device. At block 720, the method 700 includes automatically scheduling a transition event for the current loop iteration, where occurrence of the transition event (during the current loop iteration) causes the computing device to transition from a first power state to a second power state, such as in the manners described herein. As discussed herein, other approaches for indicating power state transitions may be employed. At block 730, the method 700 further include initiating a transition of the computing device from the second power state to the first power state, such as a transition from an active power state to a suspend/powered-off power state.

At block 740, the method 700 includes initiating the transition of the computing device from the first power state to the second power state in response to occurrence of the transition event. At block 750, the method 700 includes gathering a set of one or more operating statistics (e.g., post-suspend or power-off statistics) of the computing device in response to the transition of the computing device from the first power state to the second power state. While the method 700 is illustrated as including gathering operating statistics only at block 750, it will be appreciated that the method 700 may also include similar operations to blocks 620 and 660 of the method 600 (e.g., gathering pre-suspend or power-off statistics and generating comparison statistics). The specific statistics that are gathered and generated using such an approach depends on the specific implementation, the information being gathered from a computing device and the specific comparison statistics that are of interest in a particular approach.

The method 700 still further includes, at block 760, modifying a loop iteration counter (e.g., incrementing or decrementing) to indicate completion of the current loop iteration. At block 780, a determination is made, based on the loop iteration counter, whether the loop is complete. If it is determined, at block 770, that the loop is not complete, the method 700 returns to block 720 to perform the next loop iteration (blocks 720-760). If it is determined, at block 770, that the loop is complete, the method 700 continues at block 780, and the method 700 is ended or terminated.

In the method 700, the operating statistics for a computing device that are determined during each loop iteration may include a time period measurement corresponding with a time period for the transition from the first power state to the second power state (e.g., a resume or boot time). In an embodiment where the operating statistics for a current loop iteration are combined with operating statistics from previous loop iterations, the time period for the transition from the first power state to the second power state may also be combined with time period measurement from previous loop iterations as a running average. The operating statistics of the method 700 may further include respective operational statuses for one or more hardware, software and/or firmware components of the corresponding computing device.

As noted above, the method 700 may be implemented so as to also include similar operations to the operations of blocks 620 and 660 of the method 600. In such an approach, the operating statistics and comparison statistics may also include time period measurements corresponding with a time period for the transition from the second power state (e.g., an active power state) to the first power state (e.g., a suspend/powered-off power state) and/or a comparison of respective operational statuses (e.g., for pre-suspend or power-off and post-suspend or power-off) for one or more hardware, software and/or firmware components. Also, in such an approach, the comparison statistics may further include determinations of an amount of power consumed, such as during a suspend/powered-state and/or during power state transitions.

Figure 8:
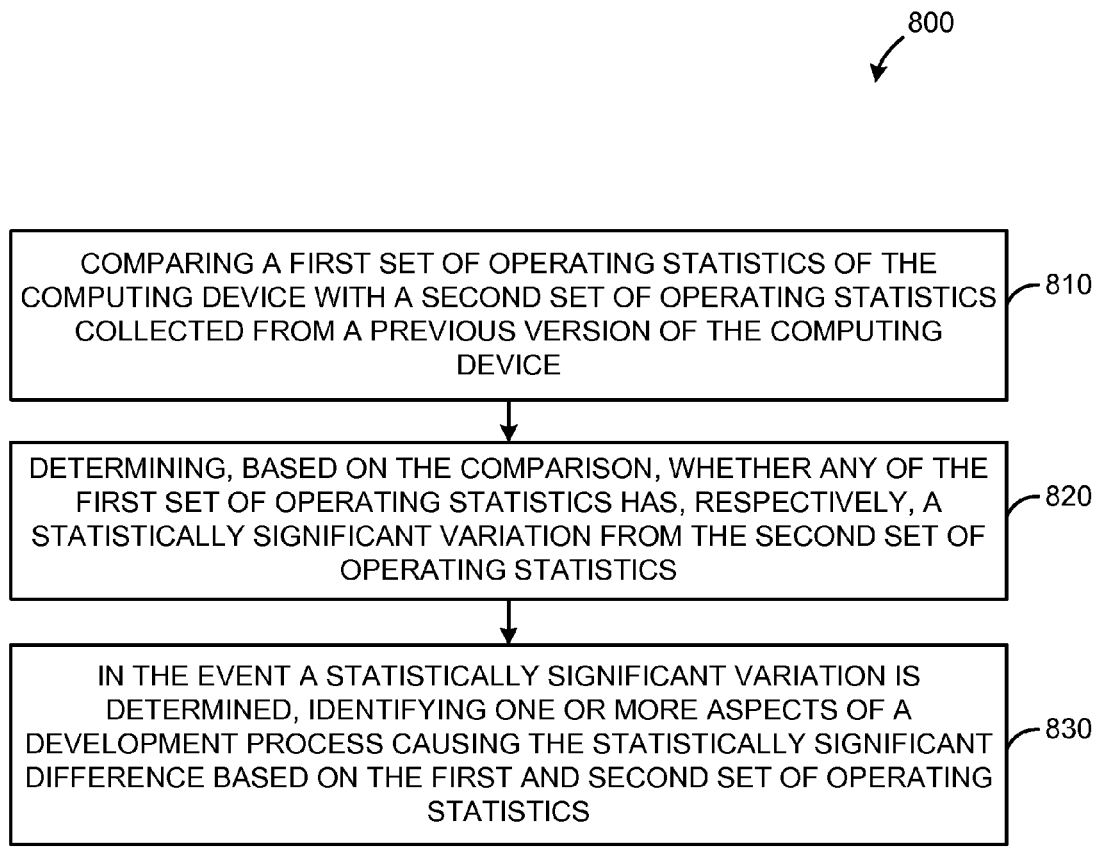
FIG. 8 is a flowchart illustrating a method in accordance with an example embodiment.

FIG. 8 is a flowchart illustrating a method 800 in accordance with an example embodiment. As with the methods 500, 600 and 700, the method 800 may be implemented in the computing device 100 illustrated in FIG. 1, or in a number of other computing device configurations. Further, the method 800 may be implemented, for example, using the techniques described above with respect to FIGS. 1, 2, 3A, 3B and 4.

In an example approach, the method 800 may be implemented in conjunction with the method 500 illustrated in FIG. 5 to evaluate the effects of development activities on the performance of a computing device. For instance, the method 800, at block 810, includes comparing a first set of operating statistics of the computing device (which may be gathered at block 540 of the method 500) with a second set of operating statistics from a previous version of the computing device. The same approach could also be applied, for example, to operating statistics gathered at block 620 of the method 600 or comparison statistics generated at block 660 of the method 600.

The method 800, at block 820, further includes determining, based on the comparison at block 810, whether any of the first set of operating statistics has, respectively, a statistically significant variation from the second set of operating statistics. For instance, a resume time or a suspend time gathered during implementation of the method 100 or the method 600 may fall outside of an acceptable statistical variation for a corresponding operating statistic of the second set of operating statistics. In other instances, an amount of power consumption determined may be above an acceptable threshold value. In other approaches, other statistics may be examined at block 820.

At block 830, in the event a statistically significant variation is determined, the method 800 includes identifying one or more aspects of a development process causing the statistically significant difference based on the first and second set of operating statistics. The particular approach for determining the one or more aspects of the development process causing the difference will depend on the particular situation and the operating statistic or statistic of concern, and a number of appropriate techniques for making such determinations are possible.

In one example, if a statistically significant variation is found, the method 800 could be performed to examine individual software changes from one version of the computing device to the next in order to determine an exact change that caused the regression. For example, the computing device 100 could use a binary search on various revisions of the computing device 100 to find a problematic change. For instance, if a regression between revision 0 and revision 50 of the computing device is noted, the method 800 could first be used to determine statistics for revision 25 of the computing device 100. Then, depending on the presence of the degradation or regression in revision 25, the method 800 could be used to obtain operating statistics for revision 13 or 37. This binary search process may be repeated until the regression is isolated to a single version or change.

As another example, the method 800 may identify a statistically significant increase in power draw or energy consumption of a computing device, such as the computing device 100. Using the method 800 to obtain various pertinent system wide operating statistics, such as CPU load, network traffic, screen brightness etc. for various revisions of the computing device then comparing those statistics, the method 800 may be used to determine root causes of performance deviations, as well as identify areas of potential improvement to performance of the computing device.

Figure 9:
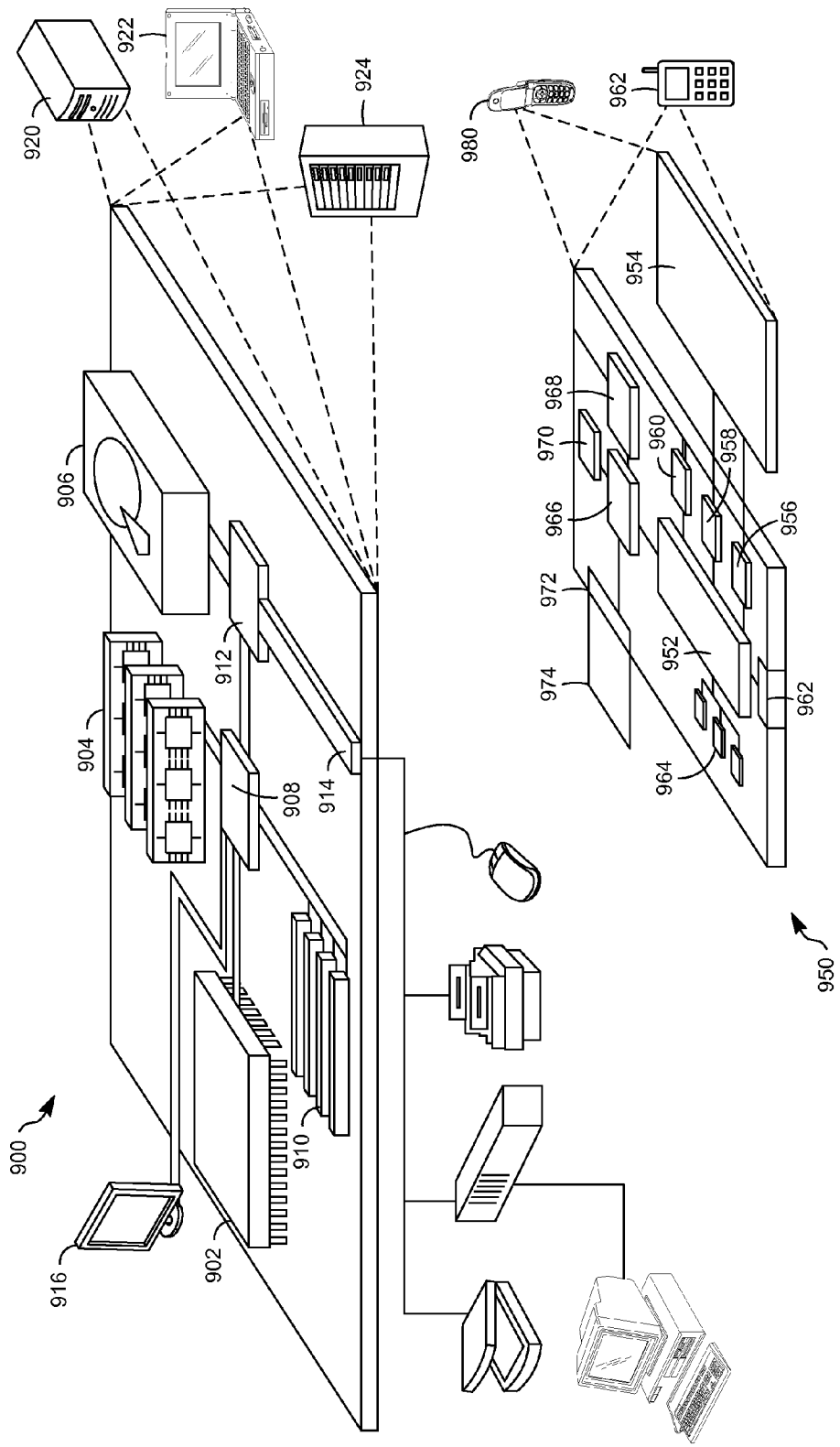
FIG. 9 is a diagram that illustrates a computing device and a mobile computing device that can be used to implement the techniques described herein in accordance with an example embodiment.

FIG. 9 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
    automatically scheduling, in a computing device, a wake-up event that causes the computing device to transition from a low power state to an active power state;
    initiating, after scheduling the wake-up event, a transition of the computing device from the active power state to the low power state;
    initiating the transition of the computing device from the low power state to the active power state in response to occurrence of the scheduled wake-up event;
    determining, in response to the occurrence of the scheduled wake-up event, a first set of operating statistics for the computing device, the first set of operating statistics including at least one of:
        a completion time of a resume process associated with the transition from the low power state to the active power state;
        an operational status of a component of the computing device after the transition from the low power state to the active power state; and
        a measurement of a battery state of the computing device; and
    analyzing the first set of operating statistics to determine at least one performance attribute of the computing device associated with the transition between the low power state and the active power state, the at least one performance attribute including at least one of a timing measurement, an indication of functional operation of computing device and a power consumption value.

2. The computer-implemented method of claim 1, wherein scheduling the wake-up event includes scheduling a real-time-clock alarm.

3. The computer-implemented method of claim 1, wherein the low power state includes one of a suspend-to-RAM power state, a suspend-to-disk power state and a powered-off power state.

4. The computer-implemented method of claim 1, wherein the active power state includes one of a low-power active power state and a full-power active power state.

5. The computer-implemented method of claim 1, wherein the at least one performance attribute of the computing device includes a time period measurement corresponding with a time period from the wake-up event until the transition from the low power state to the active power state is complete.

6. The computer-implemented method of claim 1, wherein the at least one performance attributes of the computing device includes at least one of:
    a first time period measurement corresponding with a time period from the wake-up event until an embedded controller of the computing device becomes operational;
    a second time period measurement corresponding with a time period from the embedded controller of the computing device becoming operational until firmware of the computing device becomes operational;
    a third time period measurement corresponding with a time period from the firmware becoming operational until an operating system kernel of the computing device becomes operational; and
    a fourth time period measurement corresponding with a time period from the operating system kernel becoming operational until an operating system of the computing device becomes operational.

7. The computer-implemented method of claim 1, wherein the at least one performance attribute of the computing device includes at least one of:
    respective operational statuses of one or more hardware components of the computing device; and
    respective operational statuses of one or more software components of the computing device.

8. The computer-implemented method of claim 1, wherein the at least one performance attribute of the computing device includes at least one of:
    respective time period measurements corresponding with respective time periods for one or more hardware components of the computing device to become functional after occurrence of the wake-up event; and
    respective time period measurements corresponding with respective time periods for one or more software components of the computing device to become functional after occurrence of the wake-up event.

9. The computer-implemented method of claim 1, further comprising:
    determining a second set of operating statistics of the computing device after scheduling the wake-up event and prior to occurrence of the wake-up event; and
    generating at least one comparison statistic based on the first set of operating statistics and the second set of operating statistics.

10. The computer-implemented method of claim 9, wherein the at least one comparison statistic includes an energy consumption measurement.

11. The computer-implemented method of claim 9, further comprising, based on the at least one comparison statistic, determining whether to:
    automatically schedule a second wake-up event;
    determine a third set of operating statistics of the computing device;
    initiate another transition from the active power state to the low power state;
    initiate another transition of the computing device from the low power state to the active power state in response to occurrence of the second wake-up event; and
    determine a fourth set of operating statistics of the computing device in response to the second wake-up event.

12. The computer-implemented method of claim 1, further comprising:
    comparing the first set of operating statistics of the computing device with a second set of operating statistics gathered from a previous version of the computing device;
    determining, based on the comparison, whether any of the first set of operating statistics has, respectively, a statistically significant variation from the second set of operating statistics; and in the event a statistically significant variation is determined, identifying one or more aspects of a development process causing the statistically significant variation based on the first and second set of operating statistics.

13. A computer-implemented method comprising:
establishing, in a computing device, a number of loop iterations to be performed by the computing device; and
for each loop iteration:
automatically scheduling a wake-up event that causes the computing device to transition from a low power state to an active power state;
initiating a transition of the computing device from the active power state to the low power state;
initiating the transition of the computing device from the low power state to the active power state in response to occurrence of the wake-up event;
determining, in response to the occurrence of the wake-up event, a first set of operating statistics of the computing device, the first set of operating statistics including at least one of:
a completion time of a resume process associated with the transition from the low power state to the active power state;
an operational status of a component of the computing device after the transition from the low power state to the active power state; and
a measurement of a battery state of the computing device;
modifying a loop iteration counter to indicate completion of a loop iteration; and
determining, based on the loop iteration counter and the number of loop iterations to be performed, if execution of the loop is complete; and
after completion of the loop, performing regression analysis on the first sets of operating statistics gathered during execution of the loop.

14. The computer-implemented method of claim 13, wherein the first set of operating statistics of the computing device, for each loop iteration, includes a time period measurement corresponding with a time period from the wake-up event until the transition from the low power state to the active power state is complete.

15. The computer-implemented method of claim 13, wherein the first set of operating statistics of the computing device, for each loop iteration, includes at least one of:
respective operational statuses of one or more hardware components of the computing device; and
respective operational statuses of one or more software components of the computing device.

16. The computer-implemented method of claim 13, further comprising, for each loop iteration:
determining a second set of operating statistics of the computing device after scheduling the wake-up event and prior to occurrence of the wake-up event.

17. The computer-implemented method of claim 16, wherein the second set of operating statistics of the computing device, for each loop iteration, comprises a time period measurement indicating an amount of time corresponding with the transition from the active power state to the low power state.

18. The computer-implemented method of claim 16, wherein the second set of one or more operating statistics of the computing device, for each loop iteration, includes at least one of:
respective operational statuses of one or more hardware components of the computing device; and
respective operational statuses of one or more software components of the computing device.

19. A recordable storage medium having recorded and stored thereon instructions that, when executed by a computing device, cause the computing device to:
automatically schedule a wake-up event that causes the computing device to transition from a low power state to an active power state;
initiate, after scheduling the wake-up event, a transition of the computing device from the active power state to the low power state;
initiate the transition of the computing device from the low power state to the active power state in response to occurrence of the wake-up event;
determine, in response to the occurrence of the scheduled wake-up event, a first set of operating statistics for the computing device, the first set of operating statistics including at least one of:
a completion time of a resume process associated with the transition from the low power state to the active power state;
an operational status of a component of the computing device after the transition from the low power state to the active power state; and
a measurement of a battery state of the computing device; and
perform an analysis of the first set of operating statistics to determine at least one performance attribute of the computing device associated with the transition between the low power state and the active power state, the at least one performance attribute including at least one of a timing measurement, an indication of functional operation of the computing device and a power consumption value.

20. The recordable storage medium of claim 19, wherein the instructions, when executed by the computing device, further cause the computing device to:
determine a second set of operating statistics of the computing device after scheduling the wake-up event and prior to occurrence of the wake-up event; and
generate a set of one or more comparison statistics based on the first set of operating statistics and the second set of operating statistics.

21. The recordable storage medium of claim 19, wherein the instructions, when executed by the computing device, further cause the computing device to:
compare the first set of operating statistics with a second set of operating statistics gathered from a previous version of the computing device;
determine, based on the comparison, whether any of the first set of operating statistics has, respectively, a statistically significant variation from the second set of operating statistics; and
in the event a statistically significant variation is determined, identify one or more aspects of a development process causing the statistically significant variation based on the first set of operating statistics and the second set of operating statistics.

22. A non-transitory recordable storage medium having recorded and stored thereon instructions that, when executed by a computing device, cause the computing device to:
establish a number of loop iterations to be performed by the computing device; and
for each loop iteration:
automatically schedule a wake-up event that causes the computing device to transition from a first power state to a second power state;

initiate a transition of the computing device from the second power state to the first power state;

initiate the transition of the computing device from the first power state to the second power state in response to occurrence of the wake-up event;

determine, in response to the occurrence of the scheduled wake-up event, a first set of operating statistics for the computing device, the first set of operating statistics including at least one of:

a completion time of a resume process associated with the transition from the first power state to the second power state;

an operational status of a component of the computing device after the transition from the first power state to the second power state; and a measurement of a battery state of the computing device; and modify a loop iteration counter to indicate completion of a loop iteration; and determine, based on the loop iteration counter and the number of loop iterations to be performed, if execution of the loop is complete and after completion of the loop, perform regression analysis on the first sets of operating statistics gathered during execution of the loop.

23. The recordable storage medium of claim 22, wherein the instructions, when executed by the computing device, further cause the computing device, for each loop iteration, to:

determine a second set of operating statistics of the computing device after scheduling the wake-up event and prior to occurrence of the wake-up event.

24. An apparatus comprising:

a processor; and a non-transitory recordable storage medium having instructions recorded thereon, wherein, the apparatus is configured, as result of executing the instructions, to:

automatically schedule a wake-up event that causes a computing device to transition from a low power state to an active power state;

initiate, after scheduling the wake-up event, a transition of the computing device from the active power state to the low power state;

initiate the transition of the computing device from the low power state to the active power state in response to occurrence of the wake-up event;

determine, in response to the occurrence of the scheduled wake-up event, a first set of operating statistics for the computing device, the first set of operating statistics including at least one of:

a completion time of a resume process associated with the transition from the low power state to the active power state;

an operational status of a component of the computing device after the transition from the low power state to the active power state; and a measurement of a battery state of the computing device; and perform an analysis of the first set of operating statistics to determine one or more performance attributes of the computing device associated with the transition between the low power state and the active power state, the one or more performance attributes including at least one of a timing measurement, an indication of functional operation of computing device and a power consumption value.

25. The apparatus of claim 24, further comprising a measurement module configured to gather the first set of operating statistics.

26. The apparatus of claim 24, further comprising a power manager configured to transition the computing device between the low power state and the active power state.

27. The apparatus of claim 24, wherein the apparatus is further configured, as result of executing the instructions, to:

gather a second set of operating statistics of the computing device after scheduling the wake-up event and prior to occurrence of the wake-up event; and generate a set of comparison statistics based on the first set of operating statistics and the second set of operating statistics.

28. An apparatus comprising:

a processor; and a non-transitory recordable storage medium having instructions recorded thereon, the apparatus being configured, as result of executing the instructions, to:

establish a number of loop iterations to be performed by a computing device; and for each loop iteration:

automatically schedule a wake-up event, wherein occurrence of the wake-up event causes the computing device to transition from a first power state to a second power state;

initiate a transition of the computing device from the second power state to the first power state;

initiate the transition of the computing device from the first power state to the second power state in response to occurrence of the wake-up event;

determine, in response to the occurrence of the scheduled wake-up event, a set of operating statistics for the computing device, the set of operating statistics including at least one of:

a completion time of a resume process associated with the transition from the first power state to the second power state;

an operational status of a component of the computing device after the transition from the first power state to the second power state; and a measurement of a battery state of the computing device; and modify a loop iteration counter to indicate completion of a loop iteration; and determine, based on the loop iteration counter and the number of loop iterations to be performed, if execution of the loop is complete and after completion of the loop, perform regression analysis on the sets of operating statistics gathered during execution of the loop.

29. The apparatus of claim 28, further comprising:

a measurement module configured to gather, for each loop iteration, the set of one or more operating statistics; and a power manager configured to transition the apparatus between the first power state and the second power state.

* * * * *